US011429681B2

(12) United States Patent
Roy et al.

(10) Patent No.: US 11,429,681 B2
(45) Date of Patent: Aug. 30, 2022

(54) SYSTEM FOR PERFORMING MULTI-LEVEL CONVERSATIONAL AND CONTEXTUAL VOICE BASED SEARCH (71) Applicant: Dell Products L.P., Round Rock, TX (US)

(72) Inventors: Mainak Roy, Kolkata (IN); Chitrak Gupta, Bangalore (IN); Rathi Babu, Bangalore (IN); Amrita Nistala, Vishakapatnam (IN)

(73) Assignee: Dell Products L.P., Round Rock, TX (US)

( * ) Notice: Subject to any disclaimer, the term of this patent is extended or adjusted under 35 U.S.C. 154(b) by 109 days.

(21) Appl. No.: 16/361,509

(22) Filed: Mar. 22, 2019

(65) Prior Publication Data
US 2020/0301984 A1 Sep. 24, 2020

(51) Int. Cl.
*G06F 16/9535* (2019.01)
*G06F 16/9532* (2019.01)
*G06F 16/22* (2019.01)

(52) U.S. Cl.
CPC ...... *G06F 16/9535* (2019.01); *G06F 16/2246* (2019.01); *G06F 16/9532* (2019.01)

(58) Field of Classification Search
CPC ............. G06F 16/9535; G06F 16/9532; G06F 16/2246; G06F 16/243; G06F 16/2425
See application file for complete search history.

(56) References Cited

U.S. PATENT DOCUMENTS

| | | | | |
|---|---|---|---|---|
| 5,713,020 A * | 1/1998 | Reiter | ................... | G06F 16/244 |
| 7,603,349 B1 * | 10/2009 | Kraft | ...................... | G06Q 10/10 |
| 8,326,831 B1 * | 12/2012 | Aguera y Arcas | . | G06F 16/9537 |
| | | | | 707/733 |
| 9,104,750 B1 * | 8/2015 | Dhamdhere | ........ | G06F 16/3322 |
| 9,971,774 B2 * | 5/2018 | Badaskar | ................ | G06F 16/43 |
| 10,224,035 B1 * | 3/2019 | Koenig | ................... | G06F 40/20 |
| 2003/0115289 A1 * | 6/2003 | Chinn | ...................... | G06F 16/10 |
| | | | | 709/219 |
| 2007/0038601 A1 * | 2/2007 | Guha | ................... | G06F 16/9535 |
| 2008/0114759 A1 * | 5/2008 | Yahia | ...................... | G06Q 30/02 |
| 2008/0183706 A1 * | 7/2008 | Dong | .................... | G06F 16/243 |
| 2009/0164433 A1 * | 6/2009 | R. | ......................... | G06F 16/9535 |
| 2012/0323956 A1 * | 12/2012 | Dumitru | ............. | G06F 16/2452 |
| | | | | 707/769 |
| 2017/0329820 A1 * | 11/2017 | Park | .................. | G06F 16/24522 |

* cited by examiner

*Primary Examiner* — Cheyne D Ly
(74) *Attorney, Agent, or Firm* — Terrile, Cannatti & Chambers, LLP; Emmanuel A. Rivera (57) ABSTRACT A system, method, and computer-readable medium are disclosed for improved text and voice based searching. In various embodiments, a multi-level voice search system is implemented. In various embodiments, a voice based search is converted to text, where the text is used to determine a user's intent and context of the search. The search can be for a particular object and for data or information related to the object. Subsequent searches, which can be from a conversation using voice based searching can change the context and be directed to a different more specific level of the object. Metadata can link data or information, such as documents to one another. Based on search history or patterns, data or information can be updated.

20 Claims, 6 Drawing Sheets

SYSTEM FOR PERFORMING MULTI-LEVEL CONVERSATIONAL AND CONTEXTUAL VOICE BASED SEARCH

BACKGROUND OF THE INVENTION

Field of the Invention

The present invention relates to the management of information handling systems. More specifically, embodiments of the invention provide a system, method, and computer-readable medium for improved voice based searching.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As voice based searching is becoming more popular, there is a desire to produce results that are relevant to a user's search query, and in particular to provide results that are at a specific level or levels as to the search query, and in proper context. Typical voice searches involve recognizing speech and converting the speech (i.e., spoken words) to a textual representation or converted text. Searches are then based on the converted text. Algorithms may be implemented, such as algorithms using artificial intelligence, to perform the search through a search engine. Since the searching is based on text, the search is performed as if a user has entered a text search query. The search is limited to what is entered in the search query. In other words, the search is performed based only on what the voice search converts to a textual representation. Typically, the voice based search query is converted to a broad textual query. Such voice based searches, and text based searches, are limited in providing specific level of search query and are not able to adjust dynamically to changes in a user's queries. For example, a user may desire to find information as to a server computer. Typical voice based searches may return general information as to the server computer. The user may have specific queries that change from the original query. For example, subsequent queries may be as to specific information regarding the server computer, as to functionality, security, network compatibility, third party component integration, etc. Typical text and voice based searches may not support such user needs.

SUMMARY OF THE INVENTION

A system, method, and computer-readable medium are disclosed for improved voice based searching. In various embodiments, a voice based search is converted to text, where the text is used to determine a user's intent and context of the search. The search can be for a particular object and for data or information related to the object. Subsequent searches, which can be from a conversation using voice based searching can change the context and be directed to a different more specific level of the object. Metadata can link data or information, such as documents to one another. Based on search history or patterns, data or information can be updated.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for voice based searching. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
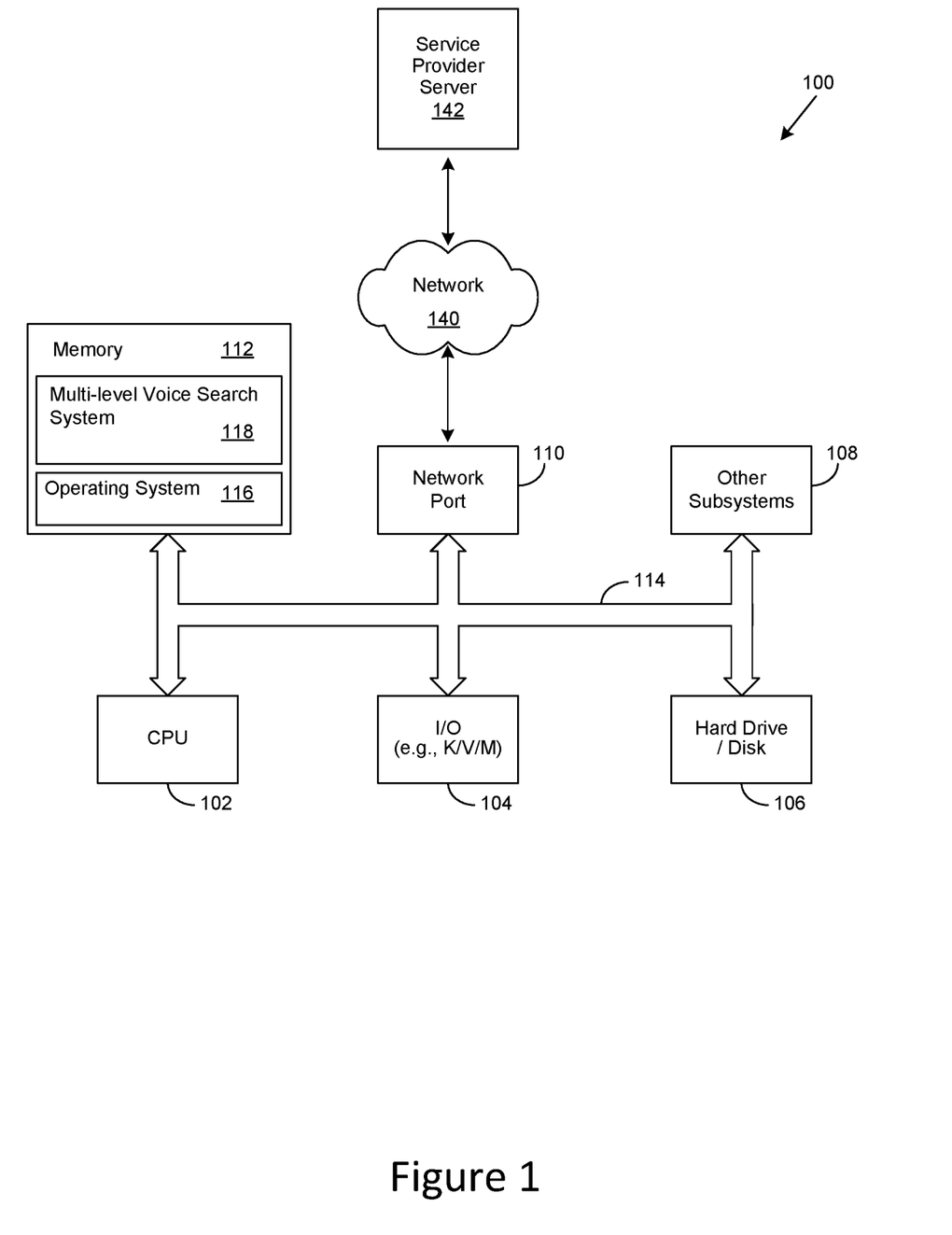
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a multi-level voice search system 118. In certain embodiments, the multi-level voice search system 118 is configured to support multiple products and/or services that are provided by different companies, vendors, suppliers, etc. In certain implementations, the multi-level voice search system 118 is provided as a service from the service provider server 142.

Figure 2:
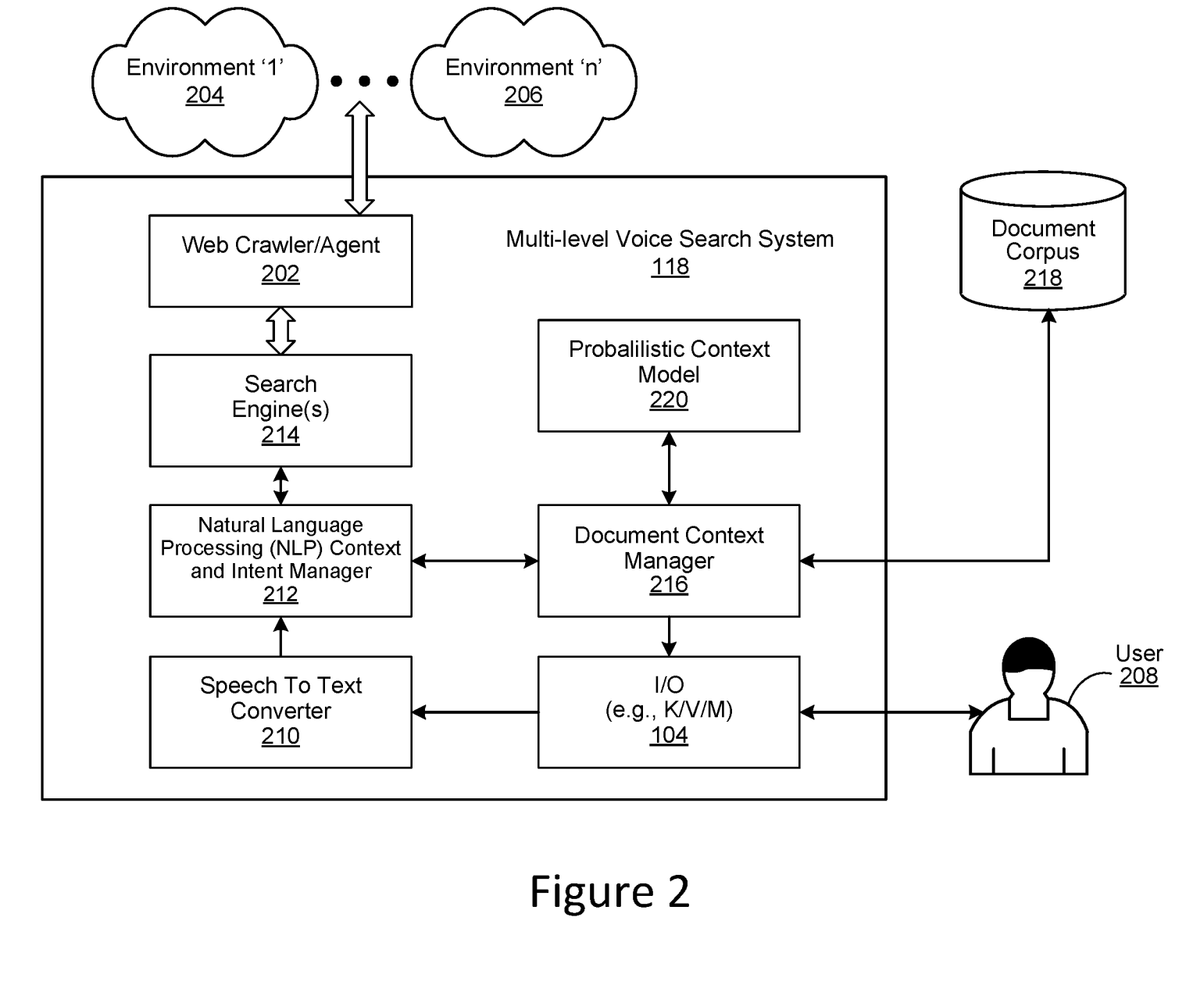
FIG. 2 is a simplified block diagram of a multi-level voice search system.

FIG. 2 is a simplified block diagram of a multi-level voice search system. In certain embodiments, the multi-level voice search system 118 is configured to support voice based searching for content, data, or information. In certain implementations, the multi-level voice search system 118 is configured to support multi-level and context searching. In particular, the multi-level voice search system 118 can be configured to create conversational patterns as to particular objects, such as products or services, and related documents that are available on different support sites, social media sites, data repositories, etc.

In certain embodiments, the multi-level voice search system 118 includes a web crawler/agent 202. Web crawler/agent 204 can be configured to interact with different sites, platforms, or environments that can include vendor support sites, social media sites, data repositories, etc. Such sites, platforms, or environments are represented as environment '1' 204 through environment 'n' 206. The environment '1' 204 through environment 'n' 206 can include different objects, such as products and product related content, data or information, such as documents of interests to users, as represented by user 208.

In certain implementations, user 208 provides a voice based query (i.e., audible query) through I/O devices 104, such as through a microphone. The voiced based query is received by a speech to text converter 210 that converts the voice based query to textual representation. A natural language processing (NLP) context and intent manager 212 receives the textual representation and instructs one or more search engines 214 to perform a search. In certain implementations, the NLP context and intent manager 212 can provide a detailed search request to search engines 214, where such detailed search request is based on a particular level and context based on an intent of user 208. For example, a contextual conversation may take place with user 208 and a support group of a company, as to a particular server computer from the company. The next level may be a query as to particular functions of the particular server computer. Another level of query may be as to security of the server computer. Another level of query may be as to specific network controllers for the server computer. Another level of query may be as to compatibility of third party cards, and the security involved in the use of such third party cards.

In certain instances, the user's search request can be dynamic or change. For example, the user's query can start at a high level query as to the server computer, the user query can change to a more specific level regarding the server computer and may change context or topic as to the server computer. For example, an initial determination may be to a server computer, which can be considered as a "primary object" in the search; however, the actual intent or level, and context, of the search query of user 208, may be to configuration compatibility issues that is a "root object" of "primary object" (i.e., the server computer).

In certain embodiments, a document context manager 216 is configured to interact with the NLP context and intent manager 212 to provide particular data or information, such as document sets related to the search query. Such data or information (e.g. document sets) can be specific to a particular "root object." The document context manager 216 can be configured to search or crawl for data or information related to a particular level (i.e., root object level), and context as to the search query of user 208. In certain implementations, the document context manager 216 searches on various databases as represented by document corpus 218. In certain implementations, a probabilistic context model 220 can be implemented to identify a root object during a dynamic conversation with user 208.

Figure 3:
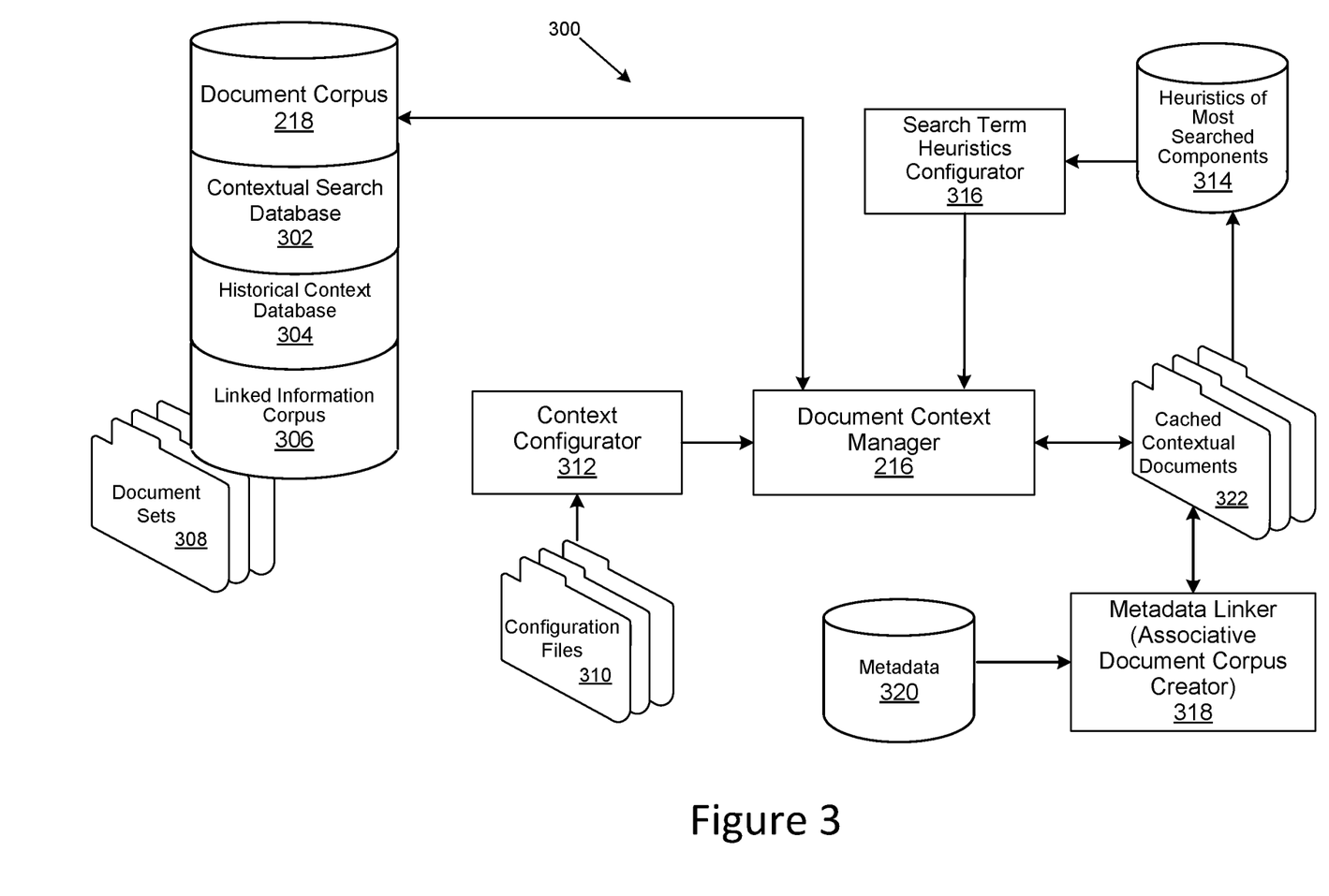
FIG. 3 is a simplified block diagram of a document context manager and associated components for use in a contextual document corpus generation.

FIG. 3 is a simplified block diagram 300 of a document context manager and associated components for use in a contextual document corpus generation. Data or information, such as document sets can be generated and updated based on various inputs. Such inputs can include historical user queries, updates to products/documents, configuration changes, product compatibility issues, etc. Therefore, document sets related to root objects can be updated based on such inputs.

In various embodiment, the multi-level voice search system 118 implements components of block diagram 300. In certain embodiments, the document corpus 218 includes or is configured with other databases or data stores. In the implementation shown, the document corpus 218 includes or is configured with a contextual search database 302, a historical context database 304, and a linked information corpus 306. The contextual search database 302 can include primary objects which are correlated to a particular conversation pattern. A root object of a primary object may change if the primary object is determined to have changed. Data or information related to the root object can be dynamically stored and archived to be cached and submitted to user 208. The historical context database 304 can include relevant data or information related to a sub context. The linked information corpus 306 includes linked data or information, such as data sets 308, where the data sets 308 can include metadata linked documents sets which can be from various sources, as further described below. In particular, metadata information can be document metadata that is added to create an association between document sets. The metadata information can be used to archive and store contextual information. For example, root object→"server"→cached document corpus→document context manager→relevant document.

In various instances, particular configurations are available for objects, and particular products and components. In various embodiments, configuration files 310 are provided that describe particular configuration setups and arrangements that apply to products and components. A context configurator 312 can be implemented to receive information for configuration files 310 to provide configuration information for particular context queries. For example, a query may be directed to implementation of a server computer on a network. The context configuration 312 can be implemented to provide information related to such a query. Information from context configuration 312 can be received by the document context manager 216.

In certain implementations, a database can be implemented of heuristics for the searched products or components, as represented by heuristics of most searched components 314. For example, heuristics can include and be based on historical user conversation patterns. A search term heuristics configurator 316 receives information from heuristics of most searched components 314. In certain instances, a root object or root object node can be identified by determining the search term heuristics of the most searched components or products. In other words, data or information, such as document sets related to particular products or components can be identified by determining the heuristics of the most searched components or products. The search term heuristics configurator 316 provides heuristics information to the document context manager 216.

As discussed, metadata can be included in the documents. In certain implementations, a metadata linker (i.e., associative document corpus creator) 318 is provided. The metadata linker 318 can receive metadata information from metadata store 320. As discussed, metadata information can include document metadata that is added to create an association between document sets.

Cached contextual documents 322 represents search results provided to the user 208. The searched results can include intermediate results, which can be changed if a determination is made as to a change in a root object or conversation pattern. The results from the cached contextual documents 322 can be further used to enhance search term heuristics of heuristics of most searched components 314. In addition, the results from the cached contextual documents 322 can be used to modify information/data from metadata linker 318.

Figure 4:
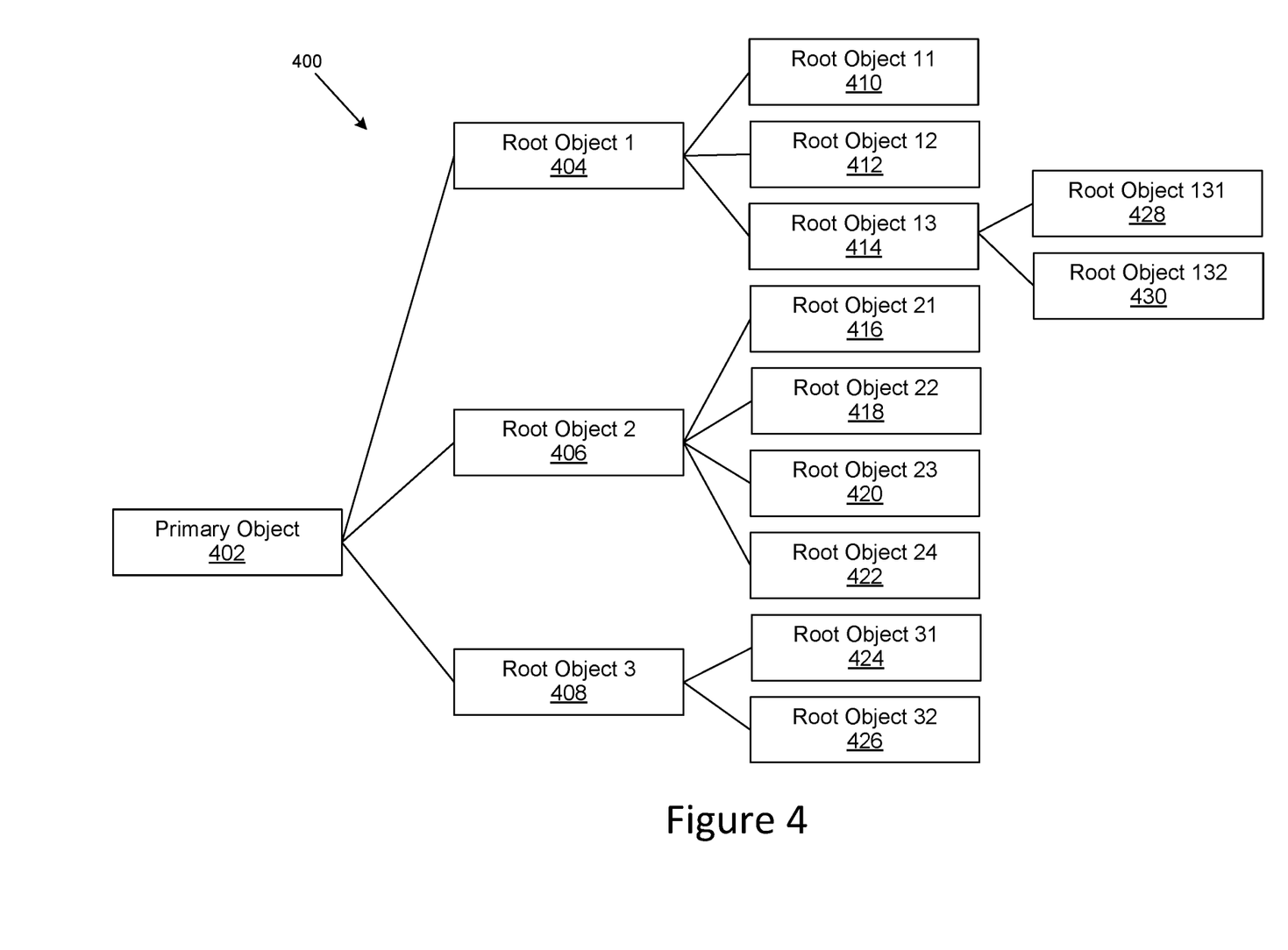
FIG. 4 is a general illustration of an object structure or hierarchy tree.

FIG. 4 shows an object structure or hierarchy tree 400. "Primary object" 402 can be a product, component, service, or anything that can be identified. In particular, "primary object" 402 can be identified by a user search, such as a voice based search. "Primary object" 402 can include data or information, such as data sets. Such data sets can be resident on or be provided from various sources, including environment '1' 204 through environment 'n' 206, and document corpus 218.

"Primary object" 402 can be consider as a top level with multiple levels below, where root objects exist at the different levels. In this example, a first level below "primary object" 402 includes "root object 1" 404, "root object 2" 406, and "root object 3" 408. A second level includes "root object 11" 410, "root object 12" 412, and "root object 13" 414 which are connected to first level "root object 1" 404; "root object 21" 416, "root object 22" 418, "root object 23" 420 and "root object 24" 422 which are connected to first level "root object 2" 406; and "root object 31" 424, and "root object 32" 426, which are connected to first level "root object 3" 408. In this example, third level "root object 131" 428 and "root object 132" 430 are connected to second level "root object 13" 414. As "primary object" 402, the root objects below can each have their own document sets, where the document sets can be from different sources, including environment '1' 204 through environment 'n' 206, and document corpus 218.

In certain implementations, an object structure or hierarchy tree, such as hierarchy tree 400 can be searched for a particular data or information, such as document sets based on a user's search query. For example, if a user performs a voice based query, which dynamically changes as to level (i.e., root object level) and context, the particular root object and associated document set are identified. The document set can then be cached as results to the user. As described above, in certain implementations, metadata can be included in the documents. In particular, metadata information can include document metadata that is added to create an association between document sets.

Figure 5:
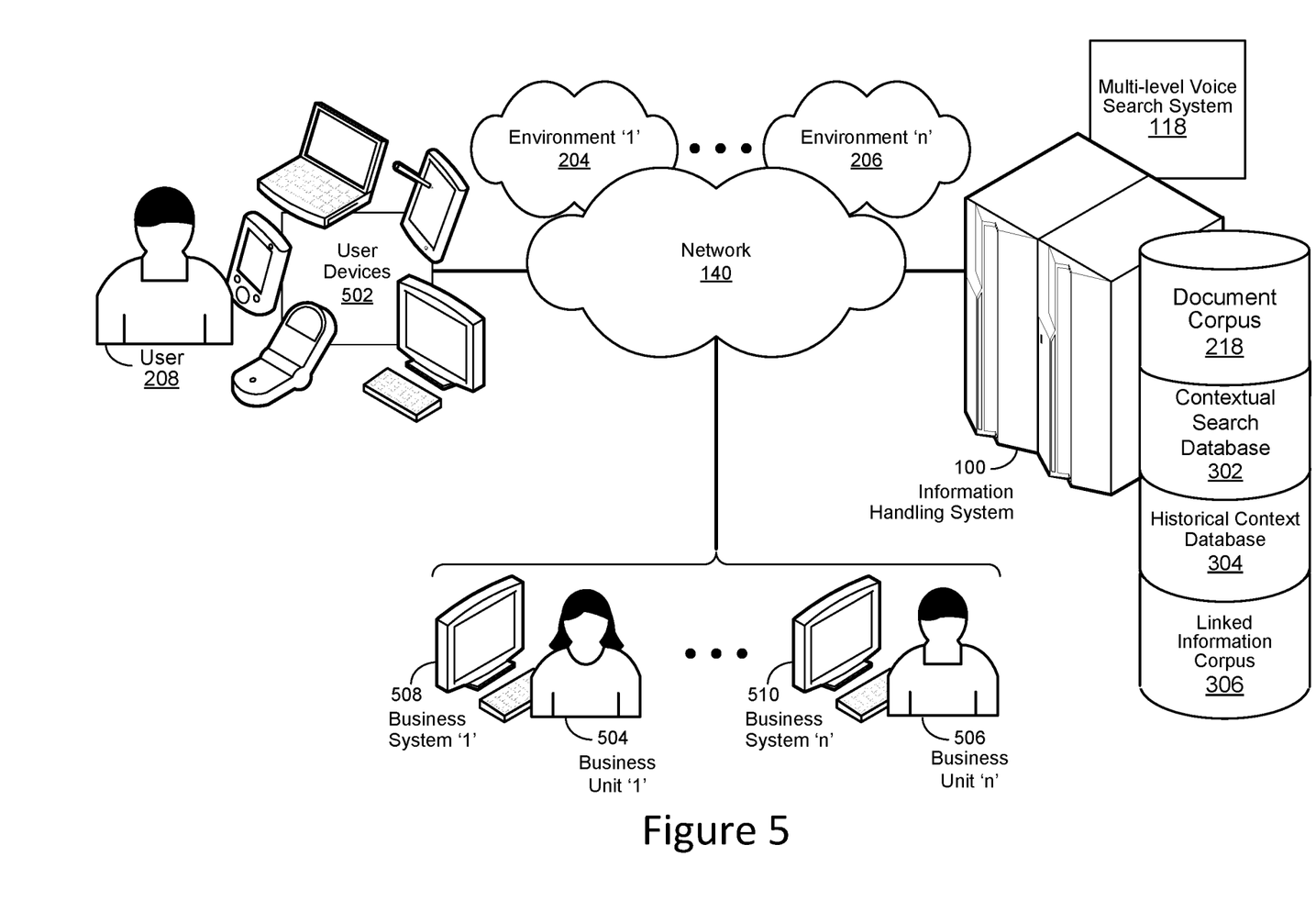
FIG. 5 is a simplified block diagram of a multi-level voice search system for voice based searching.

FIG. 5 is a simplified block diagram of a multi-level voice search system 118 implemented in accordance with an embodiment of the invention for voice based searching. In various embodiments, user 208 can perform a multi-level conversational and contextual voice based search. User 208 can be representative of multiple users. Voice based search requests from user 208 can be through a voice based search query implemented by multi-level voice search system 118.

In these and other embodiments, the user 208 may use a user device(s) 502 to search for documents/information from multi-level voice search system 118. As used herein, user device(s) 502 refers to an information handling system such as a personal computer, a laptop computer, a tablet computer, a personal digital assistant (PDA), a smart phone, a mobile telephone, or other device that is capable of communicating and processing data. In various embodiments, the user device(s) 502 is used to exchange information between the information handling system 100 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

In certain implementations, the user 208 can conduct conversations with one or more business units, as represented by business unit '1" 504 through business unit 'n' 506. Business unit 1" 504 through business unit 'n' 506 can be administrators of multi-level voice search system 118. Business unit 1" 506 through business unit 'n' 508 may implement or administer the multi-level voice search system 118 to data/information such as documents based on a particular level and context to user 208. Communication by business unit 1" 506 through business unit 'n' 508 can be through network 140 through respective business system '1' 510 through business system 'n' 512.

In certain implementations, the business unit 1" 506 through business unit 'n' 508 can include product support or customer support units, providing assistance to user 208. By providing a system for performing multi-level conversational and contextual voice based search, such business support units are able to affectively assist user 208.

Figure 6:
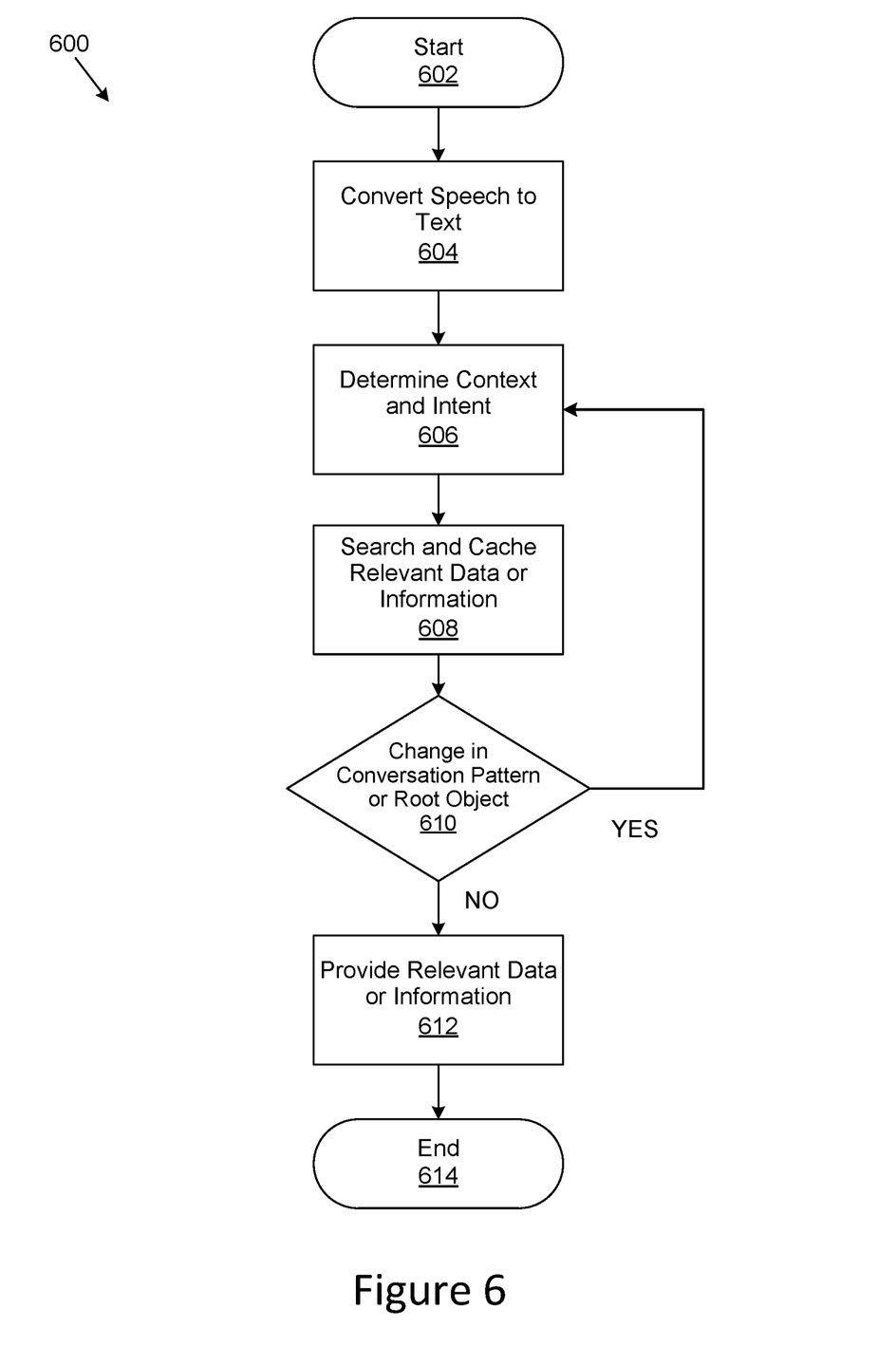
FIG. 6 is a generalized flowchart for contextual search and conversation.

In certain implementations, the information handling system 100 includes the document corpus 218, the contextual search database 302, the historical context database 304, and the linked information corpus 306. The linked information corpus 306 includes linked data or information, such as data sets 308, FIG. 6 is a generalized flowchart 600 for contextual search and conversation. In various embodiments, the multi-level voice search system 118 is implemented. In particular, the process can be performed during interaction with a user when performing a voiced based query. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602 the process 600 starts. At step 604, conversion is performed from speech to text. In particular, an audible input provided by a user as to a search query, which is converted to text, where the converted text is used to search for a particular object, such as a primary object or root object. At step 606, a determination is made as to context and user intent of the search query. The determination is made as to an object and associated data or information, such as data sets. The object can be a primary object or a root object of the primary object, which can be considered as residing on different levels of a hierarchy tree. At step 608, searching and caching for the associated or relevant data or information, such as data sets, to the object is performed. Such data sets can be resident on different sources. Metadata can also link documents and document sets. At step 610, a decision is made as to a user's search query, which may be a more refine or specific query. In particular, the change is directed to a different conversation pattern (e.g., context) or level (e.g., root object). The change can occur from an updated voice based query from the user, such as requesting for particular information regarding a primary object (e.g., product). If a change is determined to occur, then following then following the "YES: branch of step 604, the process 600 goes back to step 604. Otherwise, if no change is determined, then following the "NO" branch of step 610, step 612 is performed. At step 612, the relevant data or information, such as data sets is cached and provided to the user. At block 614, the process 600 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for multi-level conversational and contextual voice based searching comprising:
  creating conversational search patterns as to search queries for particular objects through a multi-level voice search system, wherein the particular objects are related to products, services, and documents;
  determining a context and a level of a search query based on the created conversational search patterns as to a user's intent, of the multi-level conversational and contextual voice based searching, wherein the search query includes different levels of query that includes a primary object and root objects, wherein the primary object is at a top level and root objects are at lower levels;

searching a contextual search database that includes the primary object correlated to a particular conversational search pattern, for relevant data as to the determined level of the search query;

deciding if a subsequent search query has changed the context and level;

providing the relevant data if the context and level have not changed;

identifying a particular root object and associated document set if the context and level has changed; and performing another search query for relevant data based on the identified particular root object and associated document set, if the context and level have changed.

2. The method of claim 1, wherein the determining further includes user intent.

3. The method of claim 1, wherein the determining is directed to a primary object and the subsequent search is performed for root objects of the primary object.

4. The method of claim 1, wherein the searching for relevant data is directed to a document set related to a particular object.

5. The method of claim 1, wherein the subsequent search is directed to different levels of a hierarchy tree of a primary object and root objects.

6. The method of claim 1, wherein the relevant data comprise document sets that include metadata linked document.

7. The method of claim 1 further comprising updating relevant data based on a history of search queries.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for multi-level conversational and contextual voice based searching and comprising instructions executable by the processor and configured for:

creating conversational search patterns as to search queries for particular objects through a multi-level voice search system, wherein the particular objects are related to products, services, and documents;

determining a context and a level of a search query based on the created conversational search patterns as to a user's intent, of the multi-level conversational and contextual voice based searching, wherein the search query includes different levels of query that includes a primary object and root objects, wherein the primary object is at a top level and root objects are at lower levels;

searching a contextual search database that includes the primary object correlated to a particular conversational search pattern, for relevant data as to the determined level of the search query;

deciding if a subsequent search query has changed the context and level;

providing the relevant data if the context and level have not changed;

identifying a particular root object and associated document set if the context and level has changed; and performing another search query for relevant data based on the identified particular root object and associated document set, if the context and level have changed.

9. The system of claim 8, wherein the relevant data includes metadata linked document sets.

10. The system of claim 8, wherein the relevant data originates from one or more sources.

11. The system of claim 8, wherein the object is a primary object and the subsequent query is directed to root objects of the primary object.

12. The system of claim 11, wherein primary object and root object are part of a hierarchy tree of different levels of context.

13. The system of claim 8 further comprising updating relevant data based on a history of search queries.

14. A non-transitory, computer-readable storage medium embodying computer program code, the computer program code comprising computer executable instructions configured for:

creating conversational search patterns as to search queries for particular objects through a multi-level voice search system, wherein the particular objects are related to products, services, and documents;

determining a context and a level of a search query based on the created conversational search patterns as to a user's intent, of the multi-level conversational and contextual voice based searching, wherein the search query includes different levels of query that includes a primary object and root objects, wherein the primary object is at a top level and root objects are at lower levels;

searching a contextual search database that includes the primary object correlated to a particular conversational search pattern, for relevant data as to the determined level of the search query;

deciding if a subsequent search query has changed the context and level;

providing the relevant data if the context and level have not changed;

identifying a particular root object and associated document set if the context and level has changed; and performing another search query for relevant data based on the identified particular root object and associated document set, if the context and level have changed.

15. The non-transitory, computer-readable storage medium of claim 14, wherein the performing a voice based search query is implemented with one or more search engines.

16. The non-transitory, computer-readable storage medium of claim 14, wherein the relevant data are documents sets.

17. The non-transitory, computer-readable storage medium of claim 16, wherein the document sets comprise metadata linked documents.

18. The non-transitory, computer-readable storage medium of claim 14, wherein the object is a primary object and subsequent searches are performed on root objects of the primary object.

19. The non-transitory, computer-readable storage medium of claim 14, wherein the relevant data originate from one or more sources.

20. The non-transitory, computer-readable storage medium of claim 14 further comprising updating relevant data based on a history of search queries.

* * * * *